No. 870,276.
PATENTED NOV. 5, 1907.
C. DACKIEWICZ.
DOUBLE CONE BALL BEARING AXLE.
APPLICATION FILED APR. 24, 1907.
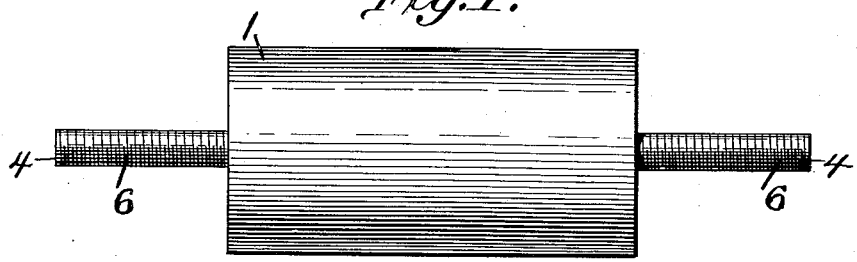
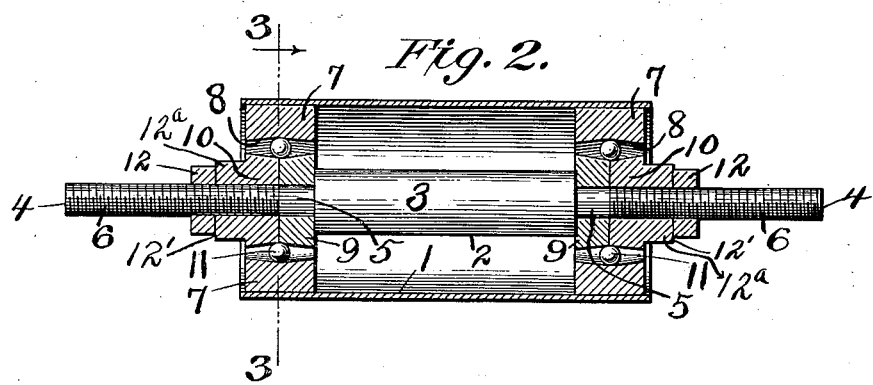
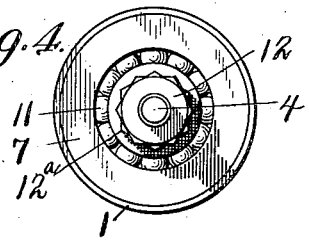 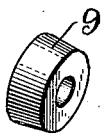 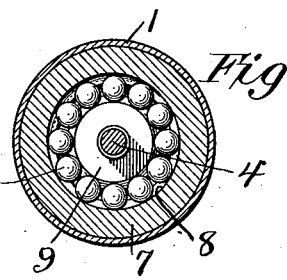
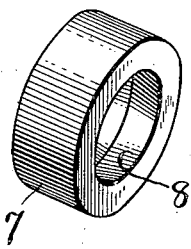 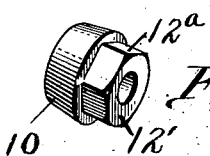
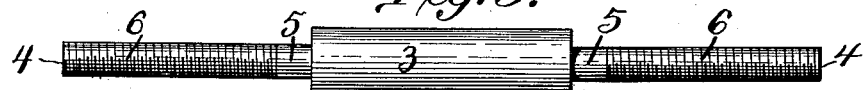
Witnesses:
Ladislaus Odziemzewski
Andrew Zykuski
Inventor,
Charles Dackiewicz

UNITED STATES PATENT OFFICE.

CHARLES DACKIEWICZ, OF DONORA, PENNSYLVANIA, ASSIGNOR OF ONE-HALF TO LADISLAUS ODZIEMCZEWSKI, OF DONORA, PENNSYLVANIA.

DOUBLE-CONE BALL-BEARING AXLE.

No. 870,276.    Specification of Letters Patent.    Patented Nov. 5, 1907.

Application filed April 24, 1907. Serial No. 370,111.

*To all whom it may concern:*

Be it known that I, CHARLES DACKIEWICZ, a citizen of the United States, residing at Donora, in the county of Washington and State of Pennsylvania, have invented certain new and useful Improvements in Double-Cone Ball-Bearing Axles, of which the following is a specification.

This invention relates to an improved double cone ball bearing axle, and has for its object the improvement of the construction of a ball bearing structure, which comprises a minimum number of parts, is comparatively simple and inexpensive to construct and very durable.

Another object of the invention is the provision of means for minimizing or reducing friction of the parts employed in constructing a ball bearing.

With these and other objects in view, the invention consists of certain novel constructions, combinations, and arrangements of parts, as will be hereinafter fully described and claimed.

In the drawings: Figure 1 is a view in side elevation of a device constructed in accordance with the present invention. Fig. 2 is a longitudinal, vertical sectional view of the structure depicted in Fig. 1. Fig. 3 is a view in side elevation of the axle. Fig. 4 is an end view of a ball bearing constructed in accordance with the present invention. Fig. 5 is a transverse, sectional view taken on line 3, 3, Fig. 2, and looking in the direction of the arrow. Fig. 6 is a perspective view of one of the annular members employed in the construction of my ball bearing. Fig. 7 is a perspective view of one of the cone members, while Fig. 8 is a perspective view of the other cone member.

Referring to the drawings by numerals, 1 designates a cylindrical casing or tube open at both ends. This casing or tube may constitute a portion of the hub of a bicycle wheel, roller-skate wheel, or any other device.

The axle or shaft 2 comprises a cylindrical body portion 3 provided with cylindrical reduced ends 4, 4. It will be obvious upon referring to Figs. 2 and 3 that the axle comprises a central enlarged cylindrical body portion and smaller cylindrical end portions. Each small cylindrical end portion 4 is provided near the enlarged central portion with a smooth surface 5, and each portion 4 is screw-threaded, as at 6, between the portion 5 and the end.

Annular members 7, provided with smooth outer surfaces, are positioned within the casing or tube 1 contiguous to its ends. The smooth outer faces of the annular members 7 fit snug against the similarly constructed inner face of the casing or tube 1. Each of the annular members 7 is provided with a concaved ball-race 8 formed upon its inner face.

One of the important features of my invention is the peculiar structure of the double cone bearing formed at each end of the casing or tube and carried by the reduced cylindrical end portions of the axle 2. Each double cone bearing comprises a primary cone or member 9 and an auxiliary cone or member 10. The primary cone 9 is provided with a smooth bore or inner face, which is, preferably, of the same width as the similarly constructed surface 5 of the reduced portion 4. The primary cone 9 is fixedly secured to this smooth face 5 of the reduced portion 4, while the auxiliary cone 10 is threaded upon and is capable of longitudinal adjustment of the threaded portion 6 of the reduced portion 4 of the axle or shaft 2. When the two cones 9 and 10 of each double cone bearing are positioned in engagement upon the reduced portion 4, as shown in Fig. 2, a double bearing is formed for the balls 11, as each ball will engage the two cones of each bearing upon one side, and at its opposite side, will engage two portions of the ball-race 8 of the annular member 7, thereby greatly reducing friction.

After the balls have been positioned as shown in Fig. 2, it is desirable to secure the adjustable auxiliary cones 10 in a fixed position upon the threaded portions 6 of the end portions 4, and, therefore, I employ locking nuts 12, which are threaded upon said portions in engagement with the outer ends 12′ of the cones 10. The outer ends 12ª of the cones 10 are, preferably, polygonal in shape, so as to facilitate the rotation of said cones upon the threaded surfaces 6.

It is to be noted that the inner cylindrical body portion 3 of the axle not only strengthens the structure of said axle, but also the general structure of my ball bearing, as the ends of said portion 3 provide a comparatively large surface engaged by the inner face of the primary cones.

It is of importance that the auxiliary or reduced portions 4 of the axle be provided with the smooth surfaces 5 for accommodating the smooth, inner face or bore of the primary cones, whereby the same can be suitably secured upon the portions 4 against independent movement. Furthermore, by reason of threading the outer ends of portions 4 and adjustably securing thereon the auxiliary cones, a very efficient and durable ball bearing is produced, as heretofore pointed out. It will be obvious that the annular members 7, together with the casing or tube 1, comprise a rotatable hub-structure, which is revolubly mounted upon the balls 11.

What I claim is:

1. In a device of the character described, the combination of an axle, comprising a central, cylindrical body portion provided at its ends with reduced, cylindrical portions, each reduced portion provided with a smooth surface at its inner end contiguous to the central portion and with a screw-threaded surface extending from said smooth surface to the end of said reduced portion, primary cones provided with smooth, inner bores in engagement with the smooth surfaces of the reduced portions and at their inner faces with the ends of said central portion, auxiliary cones threaded upon the reduced portions and in engagement with the outer side of said primary cones, the outer faces of said primary and auxiliary cones producing ball-races, each auxiliary cone provided with an end having a polygonal surface, locking nuts threaded upon the reduced ends and in engagement with the outer ends of the auxiliary cones, a casing surrounding said axle and cones, annular members positioned within and secured near the ends of said casing, each annular member provided with a ball race upon its inner face, and balls positioned between the annular members and cones and within the ball-races of said cones and annular members.

2. In a device of the character described, the combination of an axle provided with a cylindrical, central, enlarged portion and with a pair of reduced, cylindrical end portions integral with the ends of said cylindrical portion, each end portion provided with a smooth surface and a screw-threaded surface, a cone engaging and fixedly secured to the smooth surface of each reduced portion, a cone threaded upon and adjustable longitudinally of the threaded surface of each reduced portion, means for securing said adjustable cone in an adjusted position, each two cones provided with a ball-race, balls positioned within said ball-races, and a rotatable hub-structure mounted upon said balls.

3. A ball bearing, comprising an axle consisting of a central and end portions, the central portion of greater diameter than the end portions, each end portion provided with a smooth surface contiguous to one end of the central portion and with a screw-threaded surface extending from the smooth face to the end, a primary cone provided with a smooth bore secured to the smooth surface of each end portion and in engagement with one end of said central portion, an auxiliary adjustable cone threaded upon the threaded surface of each end portion and in engagement with the first-mentioned cone, a locking nut threaded upon each end-portion and normally in engagement with the outer end of the auxiliary cone, balls in engagement with said primary and auxiliary cones, annular members provided with ball-races, mounted upon said balls, and a cylindrical casing mounted upon said annular members.

CHARLES DACKIEWICZ.

Witnesses:
L. ODZIEMCZEWSKI,
A. ZYLENSKU.